Patented Feb. 2, 1932

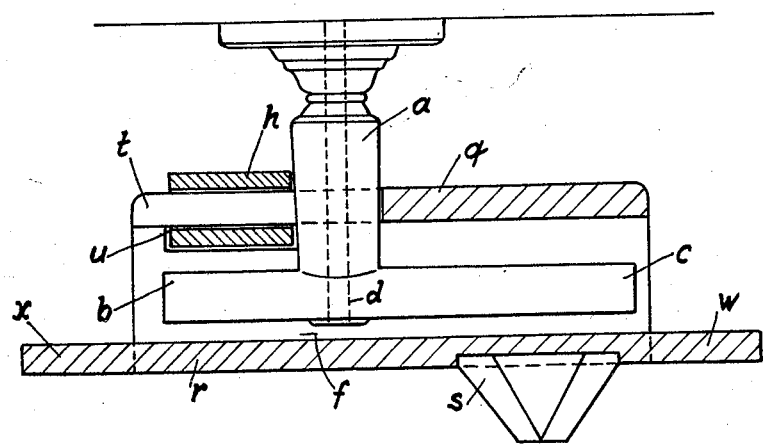
Fig.1
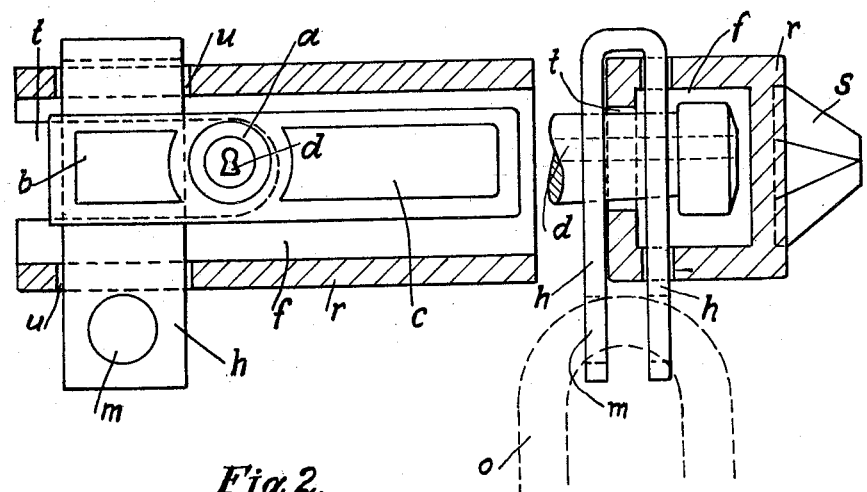
Fig.2.
Fig.3.
Inventor

1,843,586

UNITED STATES PATENT OFFICE

WILHELM WERCKMEISTER, OF BERLIN, GERMANY

LOCK PROTECTOR FOR MOTOR VEHICLES

Application filed September 27, 1930, Serial No. 484,924, and in Germany February 28, 1930.

This invention relates to a device for providing efficient protection against the unauthorized use of motor vehicles of the kind fitted with door locks to which access is had through a key passage made in the door handle. The keys used for locks of this kind are necessarily small and do not allow of any great variety of key bits, and the protection afforded by the lock is therefore rather limited.

This disadvantage is remedied by the present invention which consists in the provision of a casing adapted to be slipped on to the door handle so as to cover the key-hole and to be locked to the handle in protecting position.

Preferably the casing is tubular and formed with a slit which admits the stem of the handle, a locking member being provided which can be passed through the casing across the slit behind the stem.

Means are also provided for rendering the device conspicuous so as to give an indication of the unauthorized use of the vehicle, should the latter be boarded by the breaking of a window.

Fig. 1 of the accompanying drawings represents a horizontal section of the device in use, Fig. 2 is a vertical, longitudinal section of the same, and Fig. 3 is a cross section.

The door handle $b$, $c$ of the vehicle is arranged as a cross piece on a stem $a$. The latter is provided with a longitudinal passage $d$ through which a key, whereby the door is locked, can be admitted.

In order to prevent access to this key passage, a casing is provided which is adapted to be slipped on to the handle so as to cover the key-hole and then to be locked in position. In the illustrated form of the device, the casing $f$ is tubular and of rectangular cross section. One wall $q$ of the casing is formed with a slit $t$ which admits the stem $a$ and allows the casing to cross the latter. For locking the casing in position on the handle, a preferably U-shaped locking member $h$ is provided which is adapted to embrace the wall $q$. In order to admit this locking member the adjacent, diametrically opposite casing walls are provided with slots $u$ through which one limb of the member can be inserted across the slit $t$ outside the stem $a$, thereby preventing the casing from being withdrawn. The locking member itself may be secured by means of a padlock or the like the bow $o$ of which is passed through apertures $m$ made at the ends of the locking member $h$.

The front wall $r$ of the casing may be fitted with a light reflector $s$ and may in addition be brightly coloured so as to draw attention to its presence. This is useful in case the vehicle should be boarded by breaking a window and taken away.

The wall $r$ may be provided with end extensions $x$ and $w$ which may be curved or pointed and serve as handles so as to allow the casing to be used as a weapon.

I claim:

1. A device for protecting the key passage in the door handle of a motor vehicle, comprising a casing adapted to be slipped on to the handle, and a locking member adapted to be passed through slots in said casing and to retain the latter by engagement with the handle, said locking member having slots to receive a padlock for retaining the member in position.

2. A device for protecting the key passage in the door handle of a motor vehicle, comprising a tubular casing adapted to be slipped on to the handle and having a slit to admit the stem of the handle, and a U-shaped locking member having slots at its ends for the reception of a padlock, the casing having slots adapted to admit one limb of said member and to retain the latter across the slit in the casing wall outside the stem of the handle.

WILHELM WERCKMEISTER.